(12) United States Patent
Viscome et al.

(10) Patent No.: US 12,290,889 B2
(45) Date of Patent: May 6, 2025

(54) APPARATUS FOR REPLACING AT LEAST ONE TOOTH OF A GEAR

(71) Applicant: Inventus Holdings, LLC, Juno Beach, FL (US)

(72) Inventors: Drake J. Viscome, Jupiter, FL (US); Nickolas A. Howe, Jupiter, FL (US); Julia D. Batts, Jupiter, FL (US); Martin E. Lohan, Palm City, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 221 days.

(21) Appl. No.: 18/091,955

(22) Filed: Dec. 30, 2022

(65) Prior Publication Data
US 2024/0217038 A1 Jul. 4, 2024

(51) Int. Cl.
*B23P 15/14* (2006.01)
*B23P 6/00* (2006.01)
*F16H 55/12* (2006.01)

(52) U.S. Cl.
CPC ............... *B23P 15/14* (2013.01); *B23P 6/00* (2013.01); *F16H 55/12* (2013.01)

(58) Field of Classification Search
CPC .. B23P 15/14; B23P 6/00; F16H 55/12; F16H 2055/175; B23C 1/20; F03D 1/0664; F03D 80/502
See application file for complete search history.

(56) References Cited

U.S. PATENT DOCUMENTS

| | | | |
|---|---|---|---|
| 3,888,357 A * | 6/1975 | Bauer | F16C 33/60 212/175 |
| 5,384,950 A | 1/1995 | Kallenberger | |
| 8,287,238 B2 | 10/2012 | DiMascio | |
| 9,541,133 B2 * | 1/2017 | Noirot | F16C 41/00 |
| 9,816,556 B2 * | 11/2017 | Noirot | F16H 55/17 |
| 10,378,636 B2 | 8/2019 | Brown | |
| 11,781,634 B2 * | 10/2023 | Hofmann | F16H 55/17 74/448 |
| 2014/0112789 A1 * | 4/2014 | Noirot | F16C 33/581 74/448 |
| 2014/0112790 A1 * | 4/2014 | Noirot | F16C 33/581 74/448 |

(Continued)

FOREIGN PATENT DOCUMENTS

| | | |
|---|---|---|
| EP | 2108815 B1 | 2/2009 |
| ES | 2437199 A2 | 7/2012 |
| WO | 2004/001223 A1 | 12/2003 |

*Primary Examiner* — Victor L MacArthur
(74) *Attorney, Agent, or Firm* — Tarolli, Sundheim, Covell & Tummino LLP

(57) ABSTRACT

An apparatus for replacing at least one tooth of a gear includes an elongate anchoring lip having a laterally extending lip body with at least one anchoring hole extending longitudinally therethrough. The lip body is bounded within a lateral plane by transversely spaced front and rear lip faces and laterally spaced first and second side edges. A tooth block extends longitudinally from a selected one of the front and rear lip faces. The tooth block includes at least one replacement gear tooth extending longitudinally therealong. The tooth block is spaced laterally apart from at least one of the first and second side edges, with at least a portion of the lip body extending laterally between the tooth block and the at least one of the first and second side edges.

16 Claims, 8 Drawing Sheets

(56) References Cited

U.S. PATENT DOCUMENTS

2020/0331103 A1  10/2020  Toft
2024/0217038 A1* 7/2024  Viscome ................ B23P 15/14
2024/0217039 A1* 7/2024  Viscome ................ B23P 15/14

* cited by examiner

APPARATUS FOR REPLACING AT LEAST ONE TOOTH OF A GEAR

TECHNICAL FIELD

This disclosure relates to an apparatus and method for use of an apparatus for replacing at least one tooth of a gear and, more particularly, to an apparatus for attachment to a gear in place of at least one removed damaged tooth.

BACKGROUND

The blades on a wind turbine pitch system are moved with a motor/drive and gear teeth on an inner race of a blade bearing. The gear interface between the drive and the inner race has been observed to develop wear damage on the gear teeth on the inner race. This wear can progress to the point where aerodynamic imbalance is developed, stressing the mechanical connections in the pitch system. If left unchecked, the wear will progress until the axis no longer pitches.

Correction of this undesirable condition is commonly accomplished by either "indexing" the axis to locate the worn teeth into a range that is not used, or replacing the bearing. Both of these solutions can be time-consuming and expensive.

SUMMARY

In an aspect, alone or in combination with any other aspect, an apparatus for replacing at least one tooth of a gear is described. The apparatus includes an elongate anchoring lip having a laterally extending lip body with at least one anchoring hole extending longitudinally therethrough. The lip body is bounded within a lateral plane by transversely spaced front and rear lip faces and laterally spaced first and second side edges. A tooth block extends longitudinally from a selected one of the front and rear lip faces. The tooth block includes at least one replacement gear tooth extending longitudinally therealong. The tooth block is spaced laterally apart from at least one of the first and second side edges, with at least a portion of the lip body extending laterally between the tooth block and the at least one of the first and second side edges.

BRIEF DESCRIPTION OF THE DRAWINGS

For a better understanding, reference may be made to the accompanying drawings, in which.

DESCRIPTION OF ASPECTS OF THE DISCLOSURE

The invention comprises, consists of, or consists essentially of the following features, in any combination.

FIGS. 1-9 depict an apparatus 100 for replacing at least one tooth 102 of a gear 104. For example, the gear 104 could be located on an inner race of a wind turbine pitch system (not shown). The apparatus 100 shown in the Figures is of a type often referenced as a "denture", in the art of gear repair, because it is used to supplant one or more teeth 102 of the gear 104 which are missing and/or inoperable.

Figure 1:
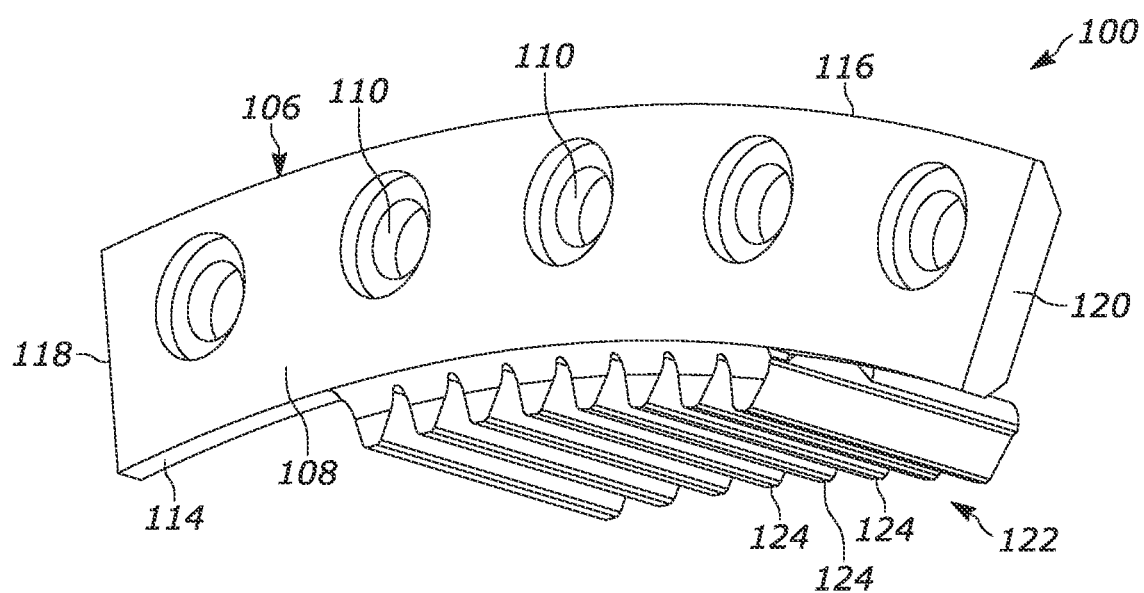
FIG. 1 is a top perspective view of an aspect of the invention, in a first example configuration.

With reference to FIG. 1, a top perspective view of the apparatus 100, the apparatus 100 includes an elongate anchoring lip 106 having a laterally extending lip body 108 with at least one anchoring hole 110 extending longitudinally therethrough. The "lateral" direction, as referenced herein, is substantially parallel to arrow La in FIG. 2. The "longitudinal" direction, as referenced herein, is substantially perpendicular to the lateral direction and extends substantially into and out of the plane of the page in the orientation of FIG. 2.

As shown in the Figures, a plurality of anchoring holes 110 may be located in predetermined hole locations along the anchoring lip 106. When multiple anchoring holes 110 are present, the predetermined hole locations may correspond to positions of fastening apertures 112 on the gear 104. The anchoring holes 110 can be countersunk, as shown in the Figures, or have any other desired features for a particular use environment. As a result, the apparatus 100 can be configured for installation on a gear 104 using existing fastening apertures 112 on the gear 104, such as, for example, using a method similar to that shown and described in co-pending U.S. patent application Ser. No. 18/092,094, filed concurrently herewith and titled "Method and System for Replacing At Least One Tooth of a Gear" (hereafter referenced as "the '094 application"), the entire contents of which are incorporated herein by reference for all purposes.

Figure 2:
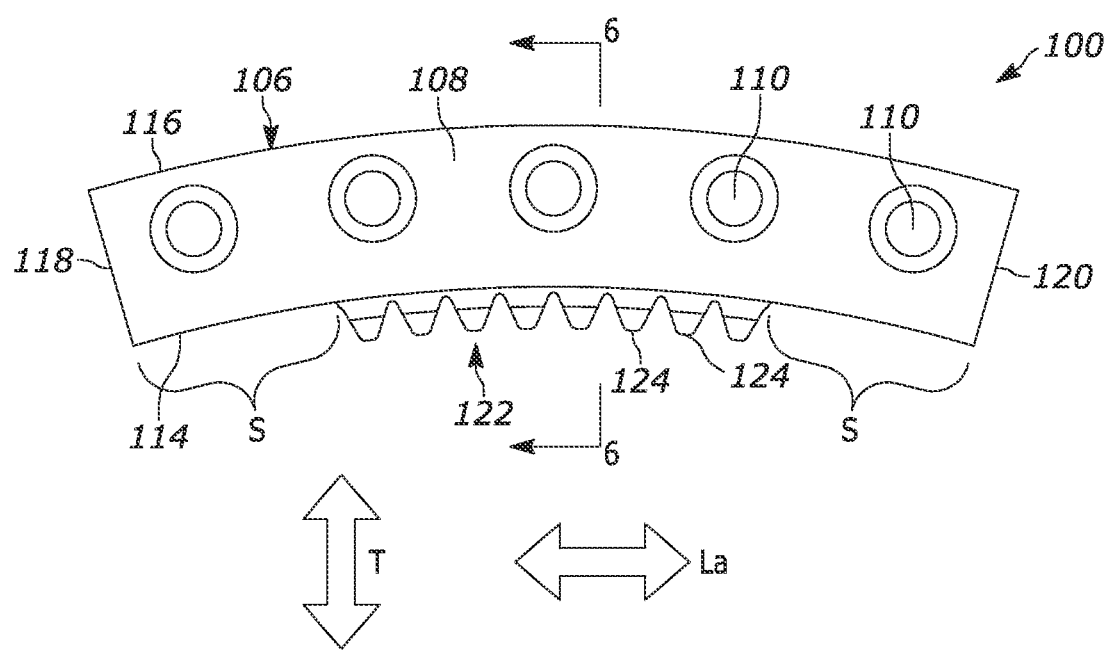
FIG. 2 is a top view of the aspect of FIG. 1.

The lip body 108 is bounded within a lateral plane (i.e., a plane extending substantially parallel to the plane of the page in FIG. 2) by transversely spaced front and rear lip faces 114 and 116, respectively, and laterally spaced first and second side edges 118 and 120, respectively. The "transverse" direction, as referenced herein, is substantially parallel to arrow T in FIG. 2. Various orthogonal direction indications are given throughout the Figures, to assist with orientation and efficient description.

Figure 3:
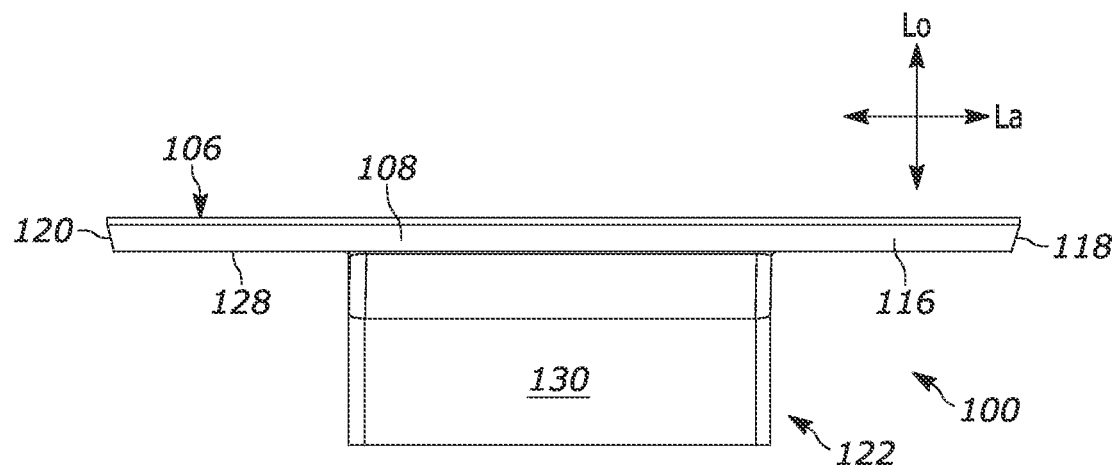
FIG. 3 is a rear view of the aspect of FIG. 1.
Figure 4:
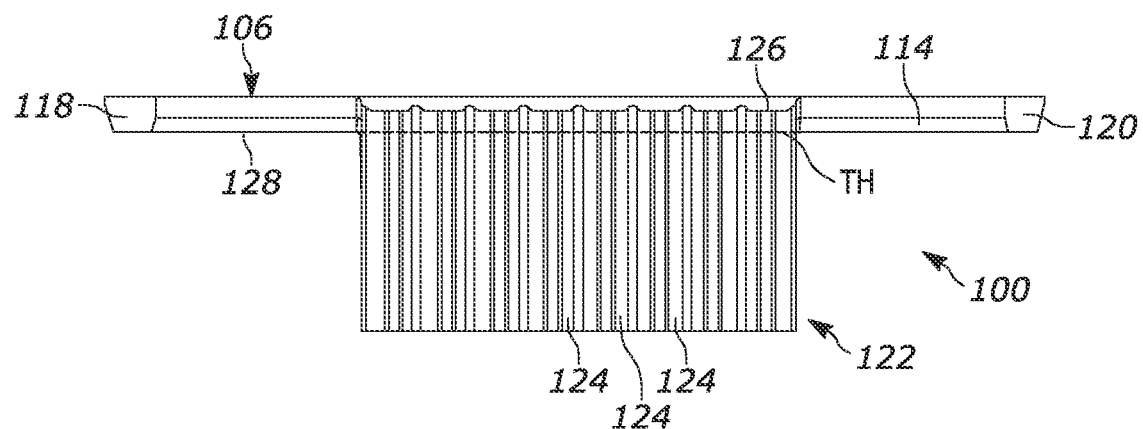
FIG. 4 is a front view of the aspect of FIG. 1.

As shown in the Figures, the anchoring lip 106 may be substantially planar (i.e., flat and without substantial curvature in the longitudinal direction, particularly as shown in FIGS. 3-4). The anchoring lip 106 may be, for many use environments, a partial rim of a circle, where the circle is substantially coincident with a circumference of the gear 104, or with another predetermined curved component bearing some relation to the original gear 104. However, one of ordinary skill in the art can readily configure a suitable anchoring lip 106—indeed, a suitable apparatus 100 in any respect—for a particular use environment, taking into account the structure(s) being replaced, the component(s) with which the apparatus 100 interacts, the available working space within the use environment, and/or any other appropriate considerations.

A tooth block 122 extends longitudinally from a selected one of the front and rear lip faces 114 and 116 (here, from the front lip face 114). The tooth block 122 includes at least one replacement gear tooth 124 extending longitudinally therealong. The replacement gear tooth 124 may completely supplant a corresponding native gear tooth 102 of the gear 104 which is being replaced by the replacement gear tooth 124. Alternatively, at least one replacement gear tooth 124 could be configured (not shown) choose supplement or only partially supplant a corresponding native gear tooth 102, as desired. One of ordinary skill in the art will be readily able to configure a suitable apparatus 100 for a particular use environment.

Figure 6:
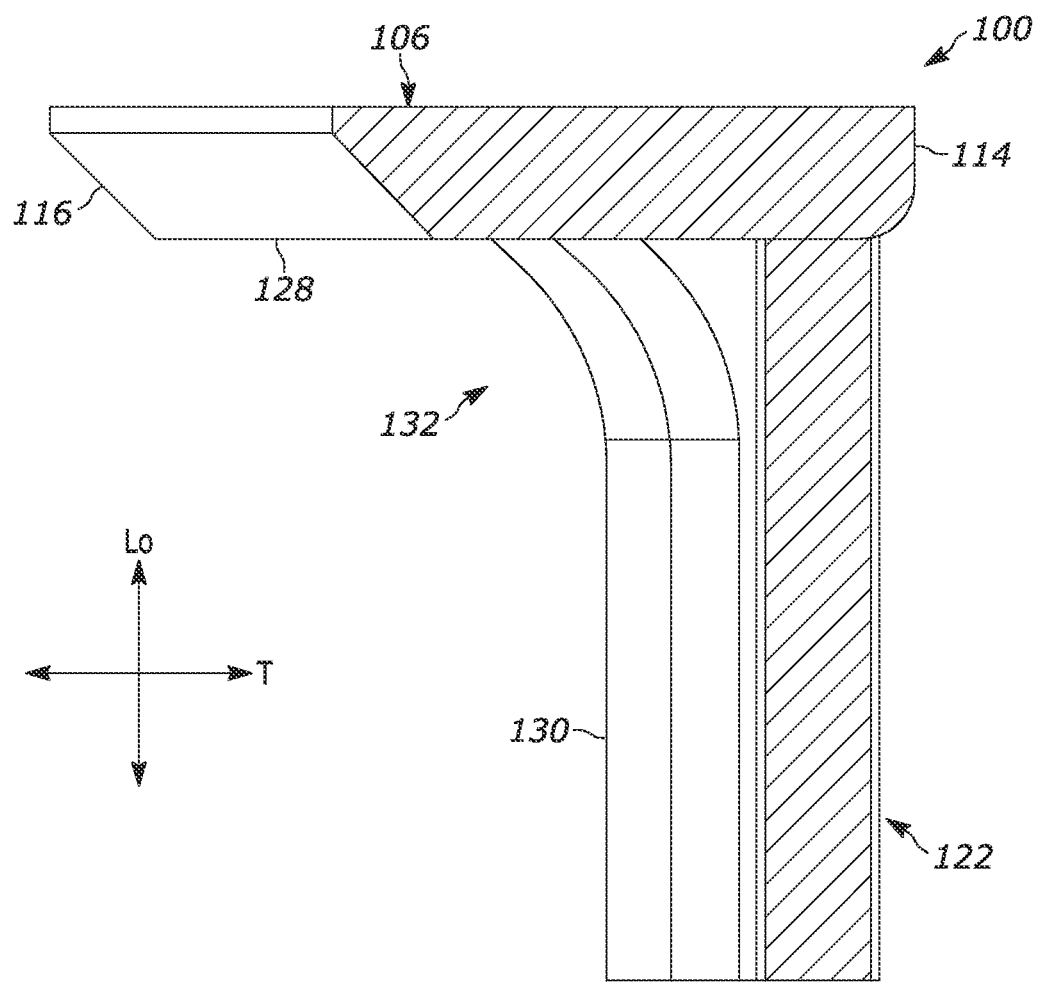
FIG. 6 is a cross-section taken along line 6-6 of FIG. 2.

As is apparent from at least FIGS. 1 and 6, the tooth block 122 may be "suspended" longitudinally from (i.e., beneath) the selected lip face 114 or 116.

With reference now to FIGS. 2-5, the tooth block 122 may be spaced laterally apart from at least one of the first and second side edges 118 and 120. That is, in some use environments, at least a portion of the lip body 108 extends laterally between the tooth block 122 and the at least one of the first and second side edges 118 and 120. That is, as represented by brackets "S" in FIG. 2, the tooth block 122 is laterally offset from at least one of the first and second side edges 118 and 120 (from both of the first and second side edges 118 and 120, in the apparatus 100 as shown in FIGS. 1-8). As a result, these "cantilevered" areas S of the lip body 108 may be useful in helping to anchor the apparatus 100 in place as a "denture" component of the gear, particularly when at least one anchoring hole 110 is in the S area(s) of the lip body 108. It is contemplated, however, that the tooth block 122 may extend laterally to, or even beyond, at least one of the first and second side edges 118 and 120, as desired for a particular use environment of the apparatus 100.

The tooth block 122 may include a plurality of replacement gear teeth 124 extending longitudinally therealong, as shown in the Figures. Each replacement gear tooth 124 may at least partially mimic a configuration of a native gear tooth 102 of the gear 104, by being matched in at least one of material, height, spacing, pitch angle, or any other desired quality(ies) which may be helpful in performing a replacement function for the native gear tooth 102. It is contemplated that, when a plurality of replacement gear teeth 124 are present on the tooth block 122, one or more of the replacement gear teeth 124 may differ from others in some physical aspect, as desired for a particular use environment.

With reference now to FIG. 4, one or more of the replacement gear teeth 124 may be laterally aligned with a toothed portion 126 of the front lip face 114. For example, and as shown in FIG. 4, that toothed portion 126 is delineated from a remainder of the replacement gear teeth 124 by dashed line TH for the purpose of description here, but each replacement gear tooth 124 is actually integrated with the respective part of the tooth portion 126 of the front lip face 114, in practice, to provide a "full height" replacement gear tooth incorporating at least a portion of the height of the anchoring lip 106. One of ordinary skill in the art, viewing the apparatus 100 shown in FIG. 4, will not readily visually distinguish the replacement gear teeth 124 from the toothed portion 126 of the front lip face 114. Of course, a similar toothed portion 126 could be provided to the rear lip face 116, when the tooth block 122 is associated with that rear lip face 116 instead of the depicted front lip face 114.

It is contemplated that, for some use environments, the replacement gear teeth 124 or another portion of the apparatus 100 could be configured specifically not to mimic part or all of the native gear teeth 102, for any desired reason. As two examples, the replacement gear teeth 124 could be shorter than, the same, or taller than the native gear teeth 102 (in the longitudinal direction) to affect the contact pressure, or could have a coating applied to reduce the wear rate. One of ordinary skill in the art will be readily able to provide a suitable apparatus 100 for a particular use environment, according to the teachings herein, to replicate the performance of the native gear teeth 102 or to provide any desired alteration to the original performance of the gear 104.

Figure 5:
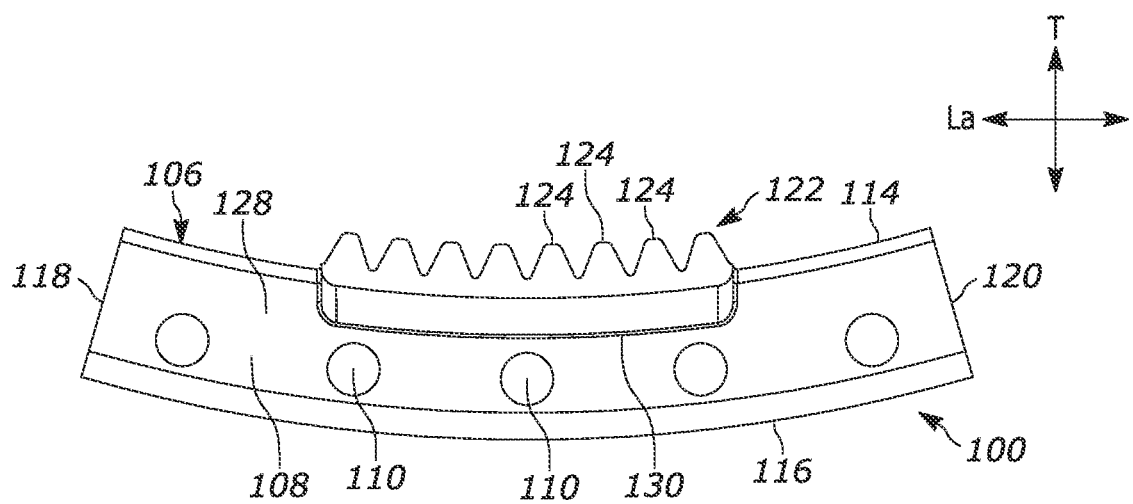
FIG. 5 is a bottom view of the aspect of FIG. 1.

Turning now to FIGS. 2 and 5, each replacement gear tooth 124 may be transversely spaced from the front lip face 114, as shown. Though the Figures in the present application are not drawn to scale, one of ordinary skill in the art can see that the root of each replacement gear tooth 124 is slightly transversely offset "ahead of" the transverse extent of the front lip face 114. Additionally, at least a portion of the tooth block 124 may be located adjacent an underside 128 of the anchoring lip 106, as shown in at least FIG. 6, with the replacement gear tooth 124 protruding transversely past the front lip face 114.

Figure 7:
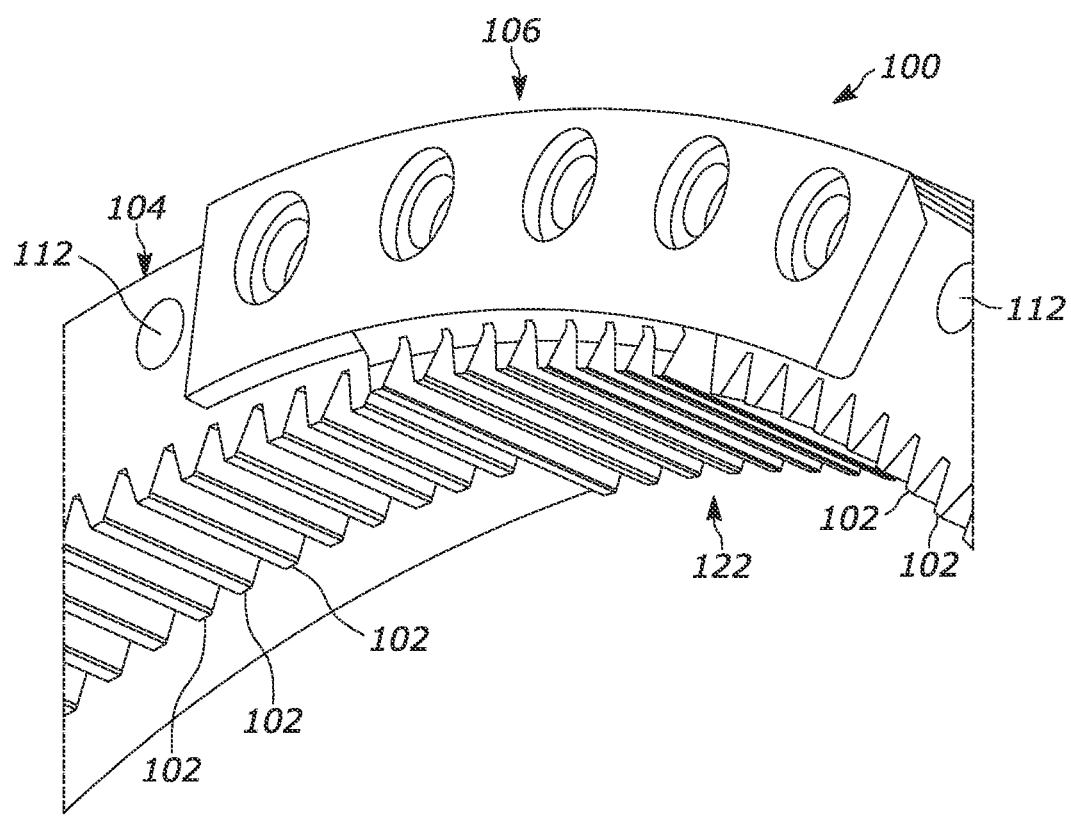
FIG. 7 is a top perspective view of the aspect of FIG. 1 in an example use environment.
Figure 8:
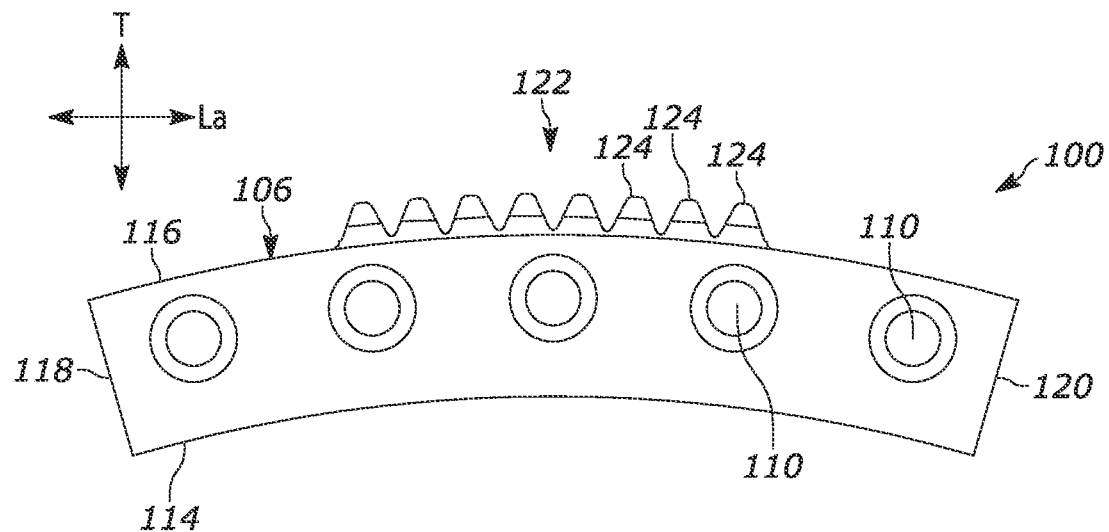
FIG. 8 is a top view of the aspect of FIG. 1 in a second example configuration.

With reference now to FIGS. 3 and 5, a rear block face 130 of the tooth block 122, oppositely facing from the replacement gear tooth 124, may be substantially smooth and may be curved corresponding to a curve of the front lip face 114. Additionally, that rear block face 130 may intersect the underside 128 of the anchoring lip 106 at a filleted edge 132, as shown in FIG. 6. The rear block face 130 may be configured in any desired manner for mating contact with at least a portion of a gear 104 containing the teeth 102 which the replacement gear teeth 124 are used to replace. This arrangement is shown in FIG. 7. The process of bringing the apparatus 100 into the configuration shown in FIG. 7 is disclosed in more detail in the '094 application, incorporated by reference above.

It should be noted that, while certain features of the tooth block 122 and other components of the apparatus 100 are described above in relation to the front lip face 114, one of ordinary skill in the art will be able to analogously relate such description to the rear lip face 116 in situations where the tooth block 122 is associated with that rear lip face 116. For example, and with reference to FIG. 2, the anchoring lip 106 is shown as being concavely curved, within the lateral plane, toward the front lip face 114, from which the tooth block 122 depends. This arrangement of FIG. 2 may be useful, for example, when the native teeth 102 are located on an inner diameter of a ring or race type gear. In contrast, and with reference to FIG. 8, the anchoring lip 106 is shown as being convexly curved, within the lateral plane, away from the front lip face 114, with the tooth block 122 depending from the rear lip face 116. This arrangement of FIG. 8 may be useful, for example, when the native teeth 102 are located on an outer circumference of a spur type gear.

Figure 9:
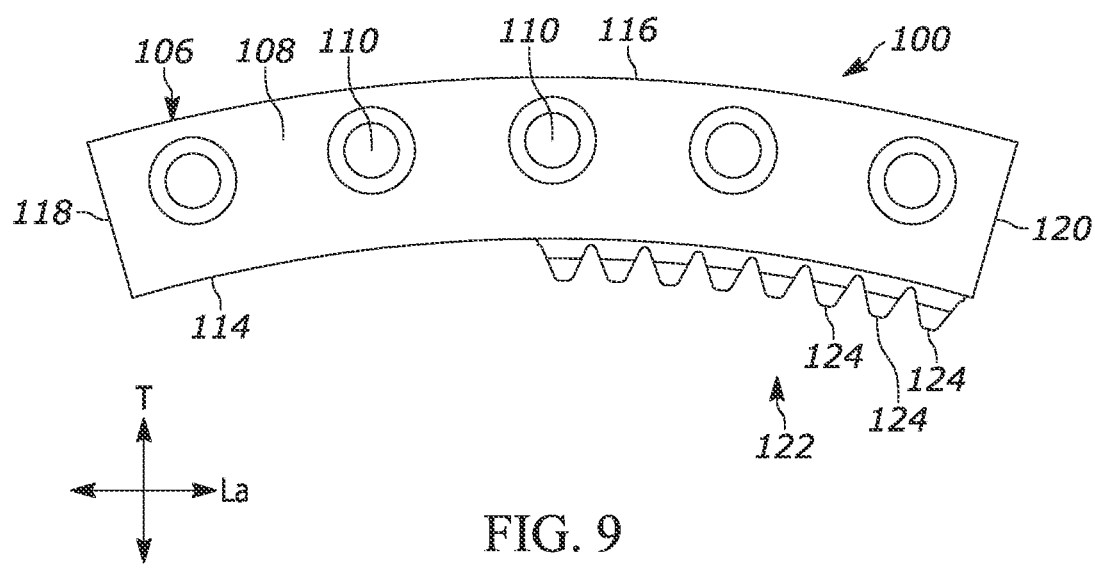
FIG. 9 is a top view of the aspect of FIG. 1 in a third example configuration.

As previously mentioned, FIG. 2 depicts the tooth block 122 spaced laterally apart from both of the first and second side edges 118 and 120, with a portion of the lip body 108 cantilevered outward from each lateral extent of the tooth block 122. As another example of an alternative configuration, however, FIG. 9 depicts the tooth block 122 spaced laterally apart from just the first side edge 118, with a portion of the lip body 108 cantilevered outward from just one lateral extent of the tooth block 122. The tooth block 122, as shown in the alternative configuration of FIG. 9, is located laterally adjacent the second side edge 120. One of ordinary skill in the art will be readily able to provide a suitably configured apparatus, based upon the present disclosure, for a desired use environment.

Finally, it is contemplated that the apparatus 100 may be integrally formed as a unitary structure. In other words, the apparatus 100 may be manufactured as a single-piece structure, using any desired additive or subtractive manufacturing process. Alternatively, the apparatus 100 may be fabricated from separate pieces or subassemblies, as desired. For example, the apparatus 100 could be configured to accept a selected tooth block 122 from a variety (not shown) of tooth blocks 122, each of which differs from the others in some physical property (e.g., number of teeth, dimensions of teeth, material, and/or any other desired quality). However, another way in which a desired variety of replacement teeth 124 could be provided is for a plurality of differently configured apparatuses 100 to be made available to a user, so that she may select the apparatus 100 including the desired physical characteristics for the present tooth 102 replacement use environment.

Unless defined otherwise, all technical and scientific terms used herein have the same meaning as is commonly understood by one of ordinary skill in the art to which the present disclosure pertains.

As used herein, the singular forms "a", "an", and "the" can include the plural forms as well, unless the context clearly indicates otherwise. It will be further understood that the terms "comprises" and/or "comprising", as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on", "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on", "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under", "below", "lower", "over", "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first", "second", etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. An apparatus for replacing at least one tooth of a gear, the apparatus comprising:
    a curved elongate anchoring lip having a lip body defined between first and second side edges of the lip, the lip body extending substantially along, and defining, a lateral direction between the first and second side edges, the lip body having at least one anchoring hole extending therethrough to define a longitudinal direction which is substantially perpendicular to the lateral direction, the lip body including curved front and rear lip faces separated by the lip body to define a transverse direction which is substantially perpendicular to both the lateral and longitudinal directions; and a tooth block extending in the longitudinal direction from a selected one of the front and rear lip faces, the tooth block including at least one replacement gear tooth extending longitudinally therealong;

wherein the tooth block is spaced apart, in the lateral direction, from at least a chosen one of the first and second side edges, with at least a portion of the lip body extending laterally between the tooth block and the chosen one of the first and second side edges.

2. The apparatus of claim 1, being integrally formed as a unitary structure.

3. The apparatus of claim 1, wherein the anchoring lip is substantially planar.

4. The apparatus of claim 1, wherein the front and rear lip faces are concavely curved, toward the tooth block.

5. The apparatus of claim 1, wherein front and rear lip faces are convexly curved, away from the tooth block.

6. The apparatus of claim 1, wherein the anchoring lip is a partial rim of a circle, the circle being coincident with a circumference of the gear.

7. The apparatus of claim 1, wherein the tooth block is suspended longitudinally from the front lip face.

8. The apparatus of claim 1, wherein the tooth block is spaced laterally apart from both of the first and second side edges, with a portion of the lip body cantilevered outward from each lateral extent of the tooth block.

9. The apparatus of claim 1, wherein the at least one anchoring hole includes a plurality of anchoring holes located in predetermined hole locations spaced laterally apart along the anchoring lip, the predetermined hole locations corresponding to positions of fastening apertures on the gear.

10. The apparatus of claim 1, wherein the at least one replacement gear tooth includes a plurality of replacement gear teeth extending longitudinally along the tooth block, each replacement gear tooth at least partially mimicking a configuration of a native gear tooth of the gear.

11. The apparatus of claim 1, wherein the replacement gear tooth is transversely spaced from the front lip face.

12. The apparatus of claim 1, wherein a rear block face of the tooth block, oppositely facing from the replacement gear tooth, is substantially smooth and is curved corresponding to a curve of the front lip face.

13. The apparatus of claim 1, wherein a rear block face of the tooth block, oppositely facing from the replacement gear tooth, intersects an underside of the anchoring lip at a filleted edge.

14. The apparatus of claim 1, wherein at least a portion of the tooth block is located adjacent an underside of the anchoring lip, with the replacement gear tooth protruding transversely past the front lip face.

15. The apparatus of claim 1, wherein the replacement gear tooth completely supplants a corresponding native gear tooth of the gear which is configured to be replaced.

16. The apparatus of claim 1, wherein the portion of the lip body which extends laterally between the tooth block and at least one of the first and second side edges is adapted for overlapping at least a portion of the gear in a circumferential direction defined by a body of the gear.

\* \* \* \* \*